(12) United States Patent
Caldwell et al.

(10) Patent No.: US 8,561,459 B2
(45) Date of Patent: Oct. 22, 2013

(54) VOLUME GAUGE

(75) Inventors: Walt Caldwell, Thousand Oaks, CA (US); Clark A. Pentico, Simi Valley, CA (US); Lee M. Lee, Camarillo, CA (US)

(73) Assignee: Stratec Biomedical USA, Inc., Newbury Park, CA (US)

( * ) Notice: Subject to any disclaimer, the term of this patent is extended or adjusted under 35 U.S.C. 154(b) by 355 days.

(21) Appl. No.: 12/775,376

(22) Filed: May 6, 2010

(65) Prior Publication Data

US 2010/0286932 A1 Nov. 11, 2010

Related U.S. Application Data

(60) Provisional application No. 61/176,034, filed on May 6, 2009.

(51) Int. Cl.
*G01F 17/00* (2006.01)

(52) U.S. Cl.
USPC ............................................................ 73/149

(58) Field of Classification Search
USPC ................................................... 73/149, 861
See application file for complete search history.

(56) References Cited

U.S. PATENT DOCUMENTS

| | | | | |
|---|---|---|---|---|
| 3,113,448 A * | 12/1963 | Hardway, Jr. et al. | ........... | 73/149 |
| 3,453,881 A * | 7/1969 | Keng | ............................... | 73/149 |
| 3,585,861 A * | 6/1971 | Keng | ........................... | 73/865.5 |
| 4,112,738 A * | 9/1978 | Turner | ......................... | 73/32 R |
| 4,369,652 A * | 1/1983 | Gundlach | ........................ | 73/149 |
| 4,561,298 A * | 12/1985 | Pond | ................................ | 73/149 |
| 4,763,518 A * | 8/1988 | Daviaud et al. | ................ | 73/149 |
| 4,888,718 A * | 12/1989 | Furuse | ............................. | 702/50 |
| 4,899,573 A * | 2/1990 | Dimmick et al. | .............. | 73/49.2 |
| 5,151,184 A * | 9/1992 | Ferkany | ......................... | 210/514 |
| 5,421,208 A | 6/1995 | Packard et al. | | |
| 5,824,892 A * | 10/1998 | Ishii | ................................ | 73/149 |
| 5,859,365 A * | 1/1999 | Kataoka et al. | ................. | 73/149 |
| 5,861,554 A * | 1/1999 | Dimmick et al. | ............... | 73/149 |
| 6,581,452 B2 * | 6/2003 | Nakano et al. | ................... | 73/149 |
| 6,990,848 B2 * | 1/2006 | Dummer et al. | ................... | 73/38 |
| 7,707,877 B2 * | 5/2010 | Nishizu et al. | .................. | 73/149 |
| 2005/0005708 A1 | 1/2005 | Dickes | | |
| 2007/0068241 A1 * | 3/2007 | Bains | ............................. | 73/149 |

FOREIGN PATENT DOCUMENTS

| | | | | |
|---|---|---|---|---|
| DE | 4238684 A1 | * | 5/1994 | |
| DE | 4315455 A1 | * | 11/1994 | |
| EP | 1847815 | | 10/2007 | |
| JP | 59020814 A | * | 2/1984 | |
| JP | 60256015 A | * | 12/1985 | |
| JP | 06066617 A | * | 3/1994 | |
| JP | 06221892 A | * | 8/1994 | |

OTHER PUBLICATIONS

Japanese Patent Office tranlation of abstract for JP 359020814A, downloaded Jul. 24, 2012.*
Human translation of figure element legend for JP 359020814A obtained Jul. 24, 2012 (human translation of full patent pending).*
Hatamoto and Mitani translation of abstract for JP 59020814A downloaded Jul. 24, 2012.*
Hatamoto and Mintani human translation of JP 59020814A obtained Aug. 2012.*

* cited by examiner

*Primary Examiner* — Leonard Chang
*Assistant Examiner* — Natalie Huls
(74) *Attorney, Agent, or Firm* — Snell & Wilmer LLP (57) ABSTRACT

Several aspects of the volume gauge may be implemented with a pressure sensing system and/or a motion sensing system. The pressure sensing system for volume measurements may include a chamber, a pressure changing device, a pressure sensing device, and a processor. The motion sensing system for volume measurements may include a container, a flexible seal, a heating device, a sensing device, and a processor.

15 Claims, 9 Drawing Sheets

VOLUME GAUGE

CLAIM OF PRIORITY UNDER 35 U.S.C. §119

The present application for patent claims priority to U.S. Provisional Application No. 61/176,034, entitled "VOLUME GAUGE," filed May 6, 2009, and assigned to the assignee hereof and hereby expressly incorporated by reference herein.

BACKGROUND

1. Field

The present invention relates generally to systems that measure the volume of liquid and/or solid substances held in containers of various shapes and sizes. More particularly, the present invention relates to volume measuring systems that may be used in High-Throughput Screening (HTS) or Ultra-High-Throughput Screening (uHTS) systems in the fields of chemistry and/or biology.

2. Related Art

A typical procedure for HTS and uHTS systems includes dispensing one or more liquid or solid substances, such as cells, reagents, media, and buffers, into one or more containers, such as test tubes, microplates, or cuvettes, and transferring such substances to be incubated, centrifuged, and read. Because most parts of the HTS and uHTS systems operate in a closed loop fashion, any undesirable condition may not be detected until the liquid or solid substances are ready to be read. For a large screening involving hundreds or even thousands of containers, a tremendous amount of test substances could be wasted unnecessarily.

More specifically, HTS and uHTS systems generally have one or more dispensing operations where fluid is dispensed into the containers. Dispense nozzles used for the dispensing operation are generally very small, and therefore can easily be blocked or clogged during the dispensing operation. If one or more of the dispensing nozzles are blocked, then the corresponding containers will be empty. Likewise, if one or more of the dispensing nozzles are partially blocked, then such blockage may cause the dispensing stream to be off target, thereby reducing the amount of dispensed substances intended for testing.

Hence it is essential to ensure that the test substances are properly dispensed into the containers during the screening operation. Some attempts have been made in the past to provide a system that measures the volume of the test substances dispensed in the containers. For example, an optical sensing system may be used in detecting the volume of test substances in several containers. However, the accuracy of such approach is limited by the shape and dimension of the containers and/or the shape of the test substances. More specifically, the optical sensing system may not yield accurate result when the containers contain uneven or irregular reflective surfaces, or when the test substances absorb or deflect too much light.

SUMMARY

Several aspects of the volume gauge may be implemented with a pressure sensing system and/or a motion sensing system. The pressure sensing system for volume measurement may include a chamber, a pressure changing device, a pressure sensing device, and a processor. The motion sensing system for volume measurement may include a container, a flexible seal, a heating device, a sensing device, and a processor.

One aspect of the present invention is to provide a volume measurement system capable of measuring the volume of the fluid or solid substance in the containers to ensure that such substance is present and/or properly dispensed into the containers. Another aspect of the invention is to provide a quick and efficient way to examine a large quantity of containers with reliable volume measurements of the substance contained therein, thereby increasing the reliability of the HTS system and/or the uHTS system. One advantage of the present invention may include allowing volume measurement of containers with undefined container shape as well as liquid or solid substances with irregular shape. Another advantage of the present invention may include a contact free volume measurement system that prevents cross contamination of specimens from different containers.

Among other algorithmic approaches and scientific principles, both systems may adopt the ideal gas law to derive, determine or calculate an available space volume and a substance volume of a container. Moreover, both systems may readily identify the presence or absence of a liquid substance, a solid substance, or combinations thereof located inside a container.

A pressure sensing system for volume measurements may include a chamber having a sealable access port, a pressure changing device configured to apply a predetermined pressure to a gas substance contained within the chamber with the sealable access port sealed thereby defining a chamber volume, a pressure sensing device configured to measure a first pressure with the sealable access port sealed and a second pressure with the sealable access port opened such that the chamber is coupled to a container via the sealable access port, and a processor configured to determine an available space volume of the container by using the chamber volume, the first pressure, and the second pressure.

A pressure sensing system for volume measurements may include a chamber defining an opening, a pressure changing device configured to apply a first pressure to a gas substance in the chamber thereby defining a chamber volume, wherein a reference container having a reference volume retains a reference pressure when coupled to the chamber via the opening, and wherein a container having an available space volume retains a second pressure when coupled to the chamber via the opening, a pressure sensing device configured to measure the reference pressure of the reference container and the second pressure of the container, and a processor configured to determine the available space volume of the container by using the second pressure, the reference pressure, the chamber volume, and the reference volume.

A motion sensing system for volume measurements may include a container defining an opening, a flexible seal sealing the opening of the container, a heating device configured to apply heat of a predefined temperature to a gas substance contained within the container, such that the flexible seal is stretched to form a top portion and a bottom portion, a sensing device configured to detect a stretch distance from the top portion of the flexible seal to the bottom portion of the flexible seal, and a processor configured to determine an available space volume of the container by using the stretch distance and the predefined temperature.

A method for measuring volume may include the steps of applying a predefined input pressure to a reference container having a reference volume, measuring a reference output pressure of the reference container, applying the predefined input pressure to a target container, measuring a target output pressure of the target container, determining an available space volume of the target container by using the target output pressure, the reference output pressure, and the reference volume, and determining a substance volume of the target container by subtracting the available space volume of the target container from the reference volume of the reference container.

A method for measuring volume may include the steps of heating a reference container filled with air and having a flexible seal, sensing a reference stretch distance from a reference top portion of the flexible seal to a bottom portion of the flexible seal, heating a target container having the flexible seal, sensing a target stretch distance from a target top portion of the flexible seal to the bottom portion of the flexible seal, and determining a substance volume of the target container by using the reference stretch distance and the target stretch distance.

A pressure sensing system for volume measurements may include a container defining a total volume having a substance volume and an available space volume defined by air located within the container such that the available space volume is substantially close to the total volume when the container is substantially filled with air, a pressure changing device configured to apply a predetermined pressure to the air located within the container, a pressure sensing device configured to measure a target pressure of the air located within the container, and a processor having a memory for storing the total volume of the container and a reference pressure of the container defined by the predetermined pressure, the processor configured to determine the available space volume and the substance volume of the container by using the total volume, the reference pressure, and the target pressure of the container.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION

Apparatus, systems and methods that implement the embodiment of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between reference elements. In addition, the first digit of each reference number indicates the figure in which the element first appears.

Figure 1A:
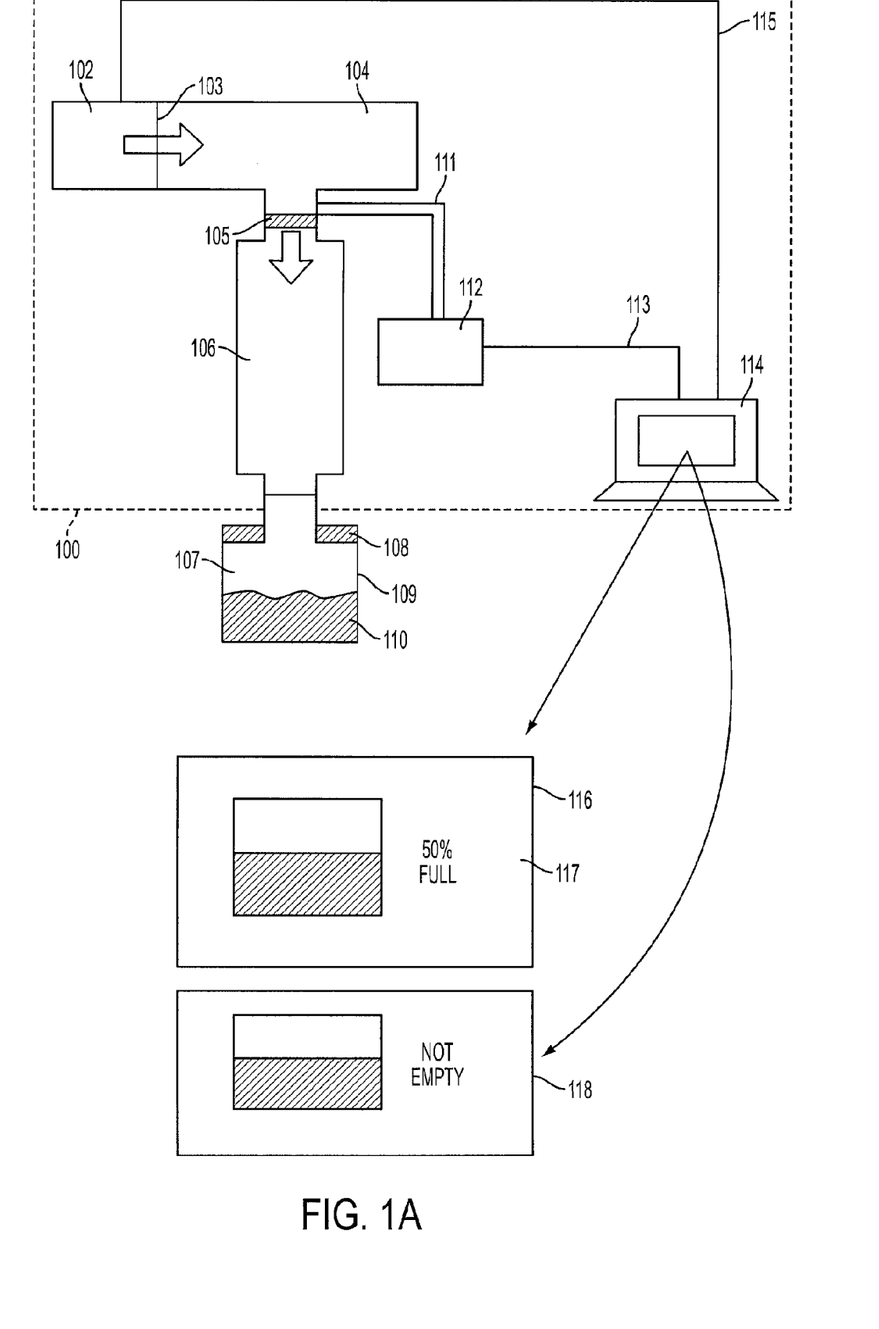
FIG. 1A is an exemplary configuration of a pressure sensing system for volume measurements according to an embodiment of the present invention.

FIG. 1A is an exemplary configuration of a pressure sensing system for volume measurement (PSVM) 100 according to an embodiment of the present invention. The PSVM 100 may include a pressure changing device 102, a chamber 104, an optional conduit 106, a pressure sensing device 112, and a processor 114. The pressure changing device 102 can be coupled to the chamber 104 via an interface 103. The chamber 104 may have a sealable access port 105, such that a finite amount of gas particles may be contained within the chamber 104 when the sealable access port 105 is sealed. Conversely, gas particles may be free to move in and out of the chamber 104 when the sealable access port 105 is open. The optional conduit 106 has a top opening and a bottom opening, and it may be coupled to the chamber 104 via the open sealable access port 105. When a container 109 is ready for measurement, it may be coupled to the chamber 104 directly via the open sealable access port 105 or indirectly via the optional conduit 106.

The pressure sensing device 112 may be coupled to the chamber 104 via a pressure sensing conduit 111. As shown in FIG. 1A, the pressure sensing conduit 111 can be coupled to the chamber 104 at a location above the sealable access port 105, such that the pressure sensing device 112 can receive the pressure of gas particles contained within the chamber 104 even when the sealable access port 105 is sealed. The pressure sensing conduit 111 can be anything capable of retaining gas particles with a finite amount of pressure. According to an embodiment of the present invention, the pressure sensing conduit 111 can be a plastic tube, a glass tube, or a tunnel fixture made of material that can prevent the escape of gas particles.

The processor 114 may be coupled to the pressure changing device 102 via a connection device 115, and it may be coupled to the pressure sensing device 112 via a connection device 113. Both the connection devices 115 and 113 can be anything capable of transmitting an electromagnetic signal. For example, both connection devices 115 and 113 can be a conducting wire, a blue-tooth device, or an Ethernet cable.

The chamber 104 can be any closed structure with a confined space and the sealable access port 105 and the interface 103, such that when the sealable access port 105 is sealed, the interface 103 may allow the pressure changing device 102 to adjust the pressure of the gas particles contained therein. On one hand, the sealable access port 105, when opened, may provide a pathway to access the space inside the chamber 104.

On the other hand, the sealable access port 105, when sealed, may block off any access to the space inside the chamber 104. The sealing mechanism of the sealable access port 105 may be implemented by any physical structure that is capable of blocking a passage at one time and opening the same passage at another time. For example, the sealing mechanism can be implemented by a valve, a lid, a cover, an enclosure, or a plug. The sealing mechanism of the sealable access port 105 can be controlled either manually or automatically by the processor 114. Although FIG. 1A shows that the chamber 104 has one sealable access port 105, the chamber 104 may also have multiple sealable access ports to allow simultaneous coupling of multiple containers according to an embodiment of the present invention.

The gas particles contained within the chamber 104 may be from any gas substance that approximates the ideal gas law, which generally states that the volume of the space occupied by a finite amount of gas particles should be directly proportional to the temperature of these gas particles and inversely proportional to the pressure applied to these gas particles. For example, the gas substance may be atmospheric air and/or inert gases according to an embodiment of the present invention.

Moreover, the chamber 104 has a location to which the pressure sensing conduit 111 may couple, such that the pressure sensing device 112 can measure the pressure of the gas particles contained within the chamber 104 after the pressure changing device 102 adjusts the gas pressure of the chamber 104. According to an embodiment of the present invention, the pressure sensing conduit 111 may be coupled to the chamber 104 at any location as long as such coupling is unaffected by the sealing of the sealable access port 105. For example, the pressure sensing conduit 111 may be coupled to the chamber 104 at a location slightly above the sealable access port 105 as shown in FIG. 1A.

The pressure changing device 102 can be any device that is capable of adjusting the pressure of a fixed amount of gas particles contained in a closed space. For example, the pressure changing device 102 may be a piston, a pump, or a heater according to various embodiments of the present invention. One of the many purposes of the pressure changing device 102 is to adjust the pressure of the gas particles contained within the chamber 104 and/or other annexed enclosing structures, such as the conduit 106 and the container 109. Depending on the types of the pressure changing device 102 adopted, the interface 103 can be anything that allows the pressure changing device 102 to serve its purposes. For example, if the pressure changing device 102 is a piston, the interface 103 may be an open space that allows the free movement of the piston. For another example, if the pressure changing device 102 is a pump, the interface 103 may be a small opening that allows additional gas particles to be pumped into the chamber 104. For yet another example, if the pressure changing device 102 is a heater, the interface 103 may be a closed wall of the chamber 104, such that gas particles may be properly retained within the chamber 104 when they are heated.

Figure 2A:
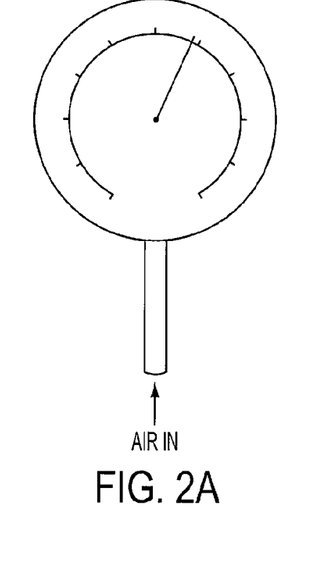
FIG. 2A shows an exemplary figure of a pressure gauge according to an embodiment of the present invention.
Figure 2B:
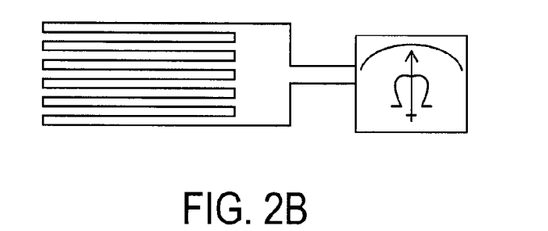
FIG. 2B shows an exemplary figure of a strain gauge according to an embodiment of the present invention.
Figure 2C:
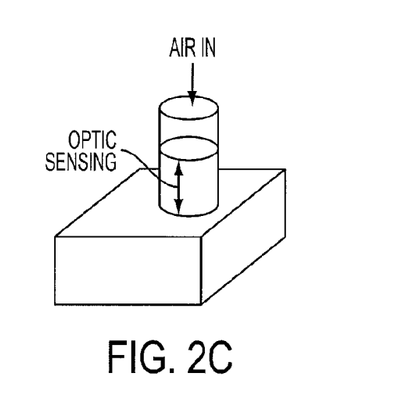
FIG. 2C shows an exemplary figure of a fiber optics pressure sensor according to an embodiment of the present invention.

The pressure sensing device 112 can be any device capable of measuring the pressure of a certain quantity of gas particles contained in a closed space. According to an embodiment of the present invention, the pressure sensing device 112 can be a pressure gauge as shown in FIG. 2A, a strain gauge as shown in FIG. 2B, or a fiber optics pressure sensor as shown in FIG. 2C. According to an embodiment of the present invention, the pressure sensing device 112 may be operated manually or automatically by the processor 114 via the connection device 113. According to another embodiment of the present invention, the measurements performed by the pressure sensing device 112 may be sent to the processor 114 electronically via the connection device 113 or input to the processor 114 manually.

The processor 114 can be any computing device capable of receiving data, processing the received data, and outputting the processed data. For example, the processor 114 can be coupled to a display and a memory. The processor 114 may be implemented using hardware, software, firmware, middleware, microcode, or any combination thereof. The processor 114 may be an Advanced RISC Machine (ARM), a computer, a controller, a digital signal processor (DSP), a microprocessor, circuitry, a processor chip, or any other device capable of processing data, and combinations thereof. The memory may include or store various routines and data. The term "memory" includes, but is not limited to, random access memory (RAM), flash memory, read-only memory (ROM), EPROM, EEPROM, registers, hard disk, removable disk, CD-ROM, DVD, wireless channels, and various other mediums capable of storing, containing or carrying instruction(s) and/or data. The display may be a LCD, LED, plasma display screen or a touch screen.

Referring to FIG. 1A, the processor 114 may receive the pressure measurement data related to the container 109, which may be partially filled with a solid or liquid substance 110. Based on the received pressure measurement data, the processor 114 may determine the volume of the available space 107 of the container 109. The processor 114 may further determine the percentage volume occupied by the solid or liquid substance 110. Finally, the processor 114 may display the processed results on the display. According to an embodiment of the present invention, the processor 114 may display in the screen shot 116 a substance volume percentage 117 of the container 109 and in the screen shot 118 whether the container 109 is empty or not.

Moreover, the processor 114 may control the pressure changing device 102 and the pressure sensing device 112 according to an embodiment of the present invention. For example, the processor 114 can initiate a volume measurement sequence, which may include instructing the sealing of the sealable access port 105, instructing the pressure changing device 102 to apply a predetermined pressure to the gas particles contained inside the chamber 104 at a certain time, instructing the pressure sensing device 112 to take a first pressure measurement while the sealable access port 105 remains sealed, and instructing the opening of the sealable access port 105 such that the pressure sensing device 112 may take a second pressure measurement.

According to yet another embodiment of the present invention, the processor 114 may store, in the memory, the values of certain predefined parameters for determining the occupied volume of the to-be-measured container 109 such as the volume of the chamber 104, the volume of the optional conduit 106, the total volume of an empty container 109, the predetermined pressure to be applied by the pressure changing device 102, and/or the resulting pressures of the chamber 104 and an empty container 109 when they received the predetermined pressure of the pressure changing device 102. For example, the processor 114 may use a look-up table to ascertain the total volume of empty containers 109 of various sizes and shapes.

The optional conduit 106 can be a fixture with at least two openings, with one opening coupled to the sealable access port 105 of the chamber 104 and with at least one other opening coupled to the container 109. One of the purposes of the optional conduit 106 is to facilitate better coupling between the sealable access port 105 and the container 109.

Because the container 109 may come in different shapes with different types of openings, the sealable access port 105 may or may not fit well with all these types of openings.

Figure 2D:
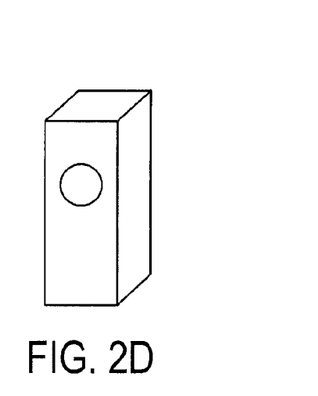
FIG. 2D shows an exemplary figure of a cuvette according to an embodiment of the present invention.
Figure 2E:
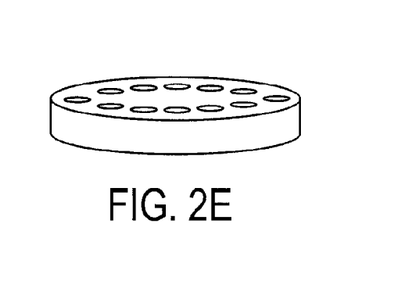
FIG. 2E shows an exemplary figure of a microplate well according to an embodiment of the present invention.
Figure 2F:
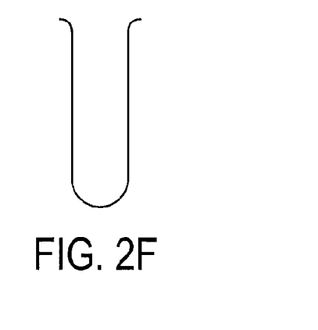
FIG. 2F shows an exemplary figure of a test tube according to an embodiment of the present invention.

According to an embodiment of the present invention, for example, the container 109 may be a cuvette as shown in FIG. 2D, a microplate well as shown in FIG. 2E, or a test tube as shown in FIG. 2F. With the help of the optional conduit 106, the container 109 may be securely coupled to the sealable access port 105, to share an enclosed common space with the chamber 104, and to reduce the chance that the gas particles contained inside this enclosed common space may escape. Alternatively, the container 109 may include a matching seal 108, which can provide better coupling to the sealable access port 105. Moreover, the matching seal 108 may prevent leaking or spilling of the solid or liquid substance 110 when the available space 107 receives an inflow of gas pressure from the chamber 104 upon the opening of the sealable access port 105.

The discussion now turns to various volume measurement schemes according to various embodiments of the present invention. According to the ideal gas law, the pressure of the gas particles contained in a finite space will decrease if such finite space expands in volume, given that the temperature of the gas particles and the other conditions remain unchanged. Conversely, if the finite space contracts in volume, the pressure of the gas particles contained therein will increase. This principle can be modeled by Equation 1, which recites $P_A V_A = P_B V_B$, wherein $P_A$ is an original pressure of an original finite space with a volume $V_A$ and $P_B$ is the reduced pressure in the expanded finite space with volume $V_B$. Rearranging Equation 1, $V_B$ can be isolated and determined in Equation 2, which recites $V_B = V_A (P_A/P_B)$.

Figure 1B:
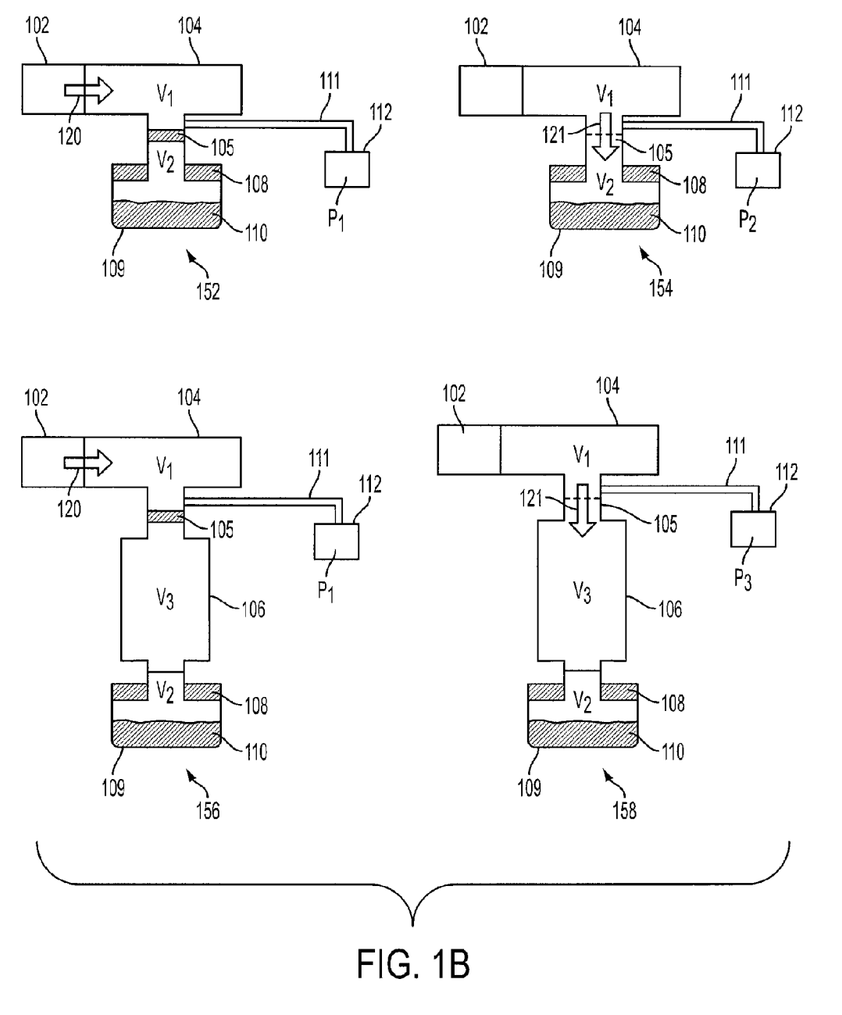
FIG. 1B is a demonstrative setup for implementing the pressure sensing system for volume measurements according to an embodiment of the present invention.

Adopting this principle, the volume of an unknown space can be determined by comparing the pressure of its gas particles with the pressure of the gas particles of a space with known volume. Referring to FIG. 1B, the diagrams 152 and 154 illustrate a volume measurement setup without the optional conduit 106, whereas the diagrams 156 and 158 illustrate a volume measurement setup involving the optional conduit 106.

For example, in the diagram 152, which illustrates a setup with components similar to those in FIG. 1A, the chamber 104 has a known chamber volume $V_1$ and the container 109 has an unknown available space volume $V_2$. The following steps may help determine the available space volume $V_2$ according to an embodiment of the present invention. First, a predetermined pressure 120 may be applied to the gas particles contained in the chamber 104 when the sealable access port 105 is sealed. Second, the pressure sensing device 112 may measure a first pressure $P_1$ of the gas particles contained in the chamber 104 with a chamber volume $V_1$. Referring to the diagram 154, the sealable access port 105 may be opened to allow the chamber 104 and the container 109 to share a common enclosed space with an expanded volume $V_1+V_2$, such that the transferring pressure 121 is flowing from the chamber 104 to the container 109. Then, the pressure sensing device 112 may measure a reduced second pressure $P_2$ of the gas particles contained within the common enclosed space with the expanded volume. Plugging $P_1$, $P_2$, $V_1$, and $V_1+V_2$ into Equation 2, $V_2$ can be determined by computing the value of $V_1 (P_1/P_2) - V_1$. If the total volume of the container 109 is known, the substance volume 110 can be further determined by subtracting $V_2$ from the total volume of the container 109.

Similarly, the same principle can be applied to the setup with the optional conduit 106 according to another embodiment of the present invention. Referring to the diagrams 156 and 158, the expanded space now has a volume $V_1+V_2+V_3$ and a reduced pressure $P_3$. Hence, by applying Equation 2 again, $V_2$ can be determined by computing the value of $V_1 (P_1/P_3) - V_1 - V_3$. If the total volume of the container 109 is known, the substance volume 110 can be further determined by subtracting $V_2$ from the total volume of the container 109.

According to yet another embodiment of the present invention, an alternative scheme may be implemented to determine the available space volume 107, as well as the substance volume 110, of the container 109. For example in FIG. 1C, the diagram 162 introduces the use of a reference container 160 with a reference volume $V_4$. Generally, the reference container 160 serves similar function as the chamber 104, which is to provide the original volume $V_A$ and the original pressure $P_A$. However, instead of having the sealable access port 105 as shown in FIGS. 1A and 1B, the chamber 104 in FIG. 1C has an opening 125 that is always open and ready for coupling.

Figure 1C:
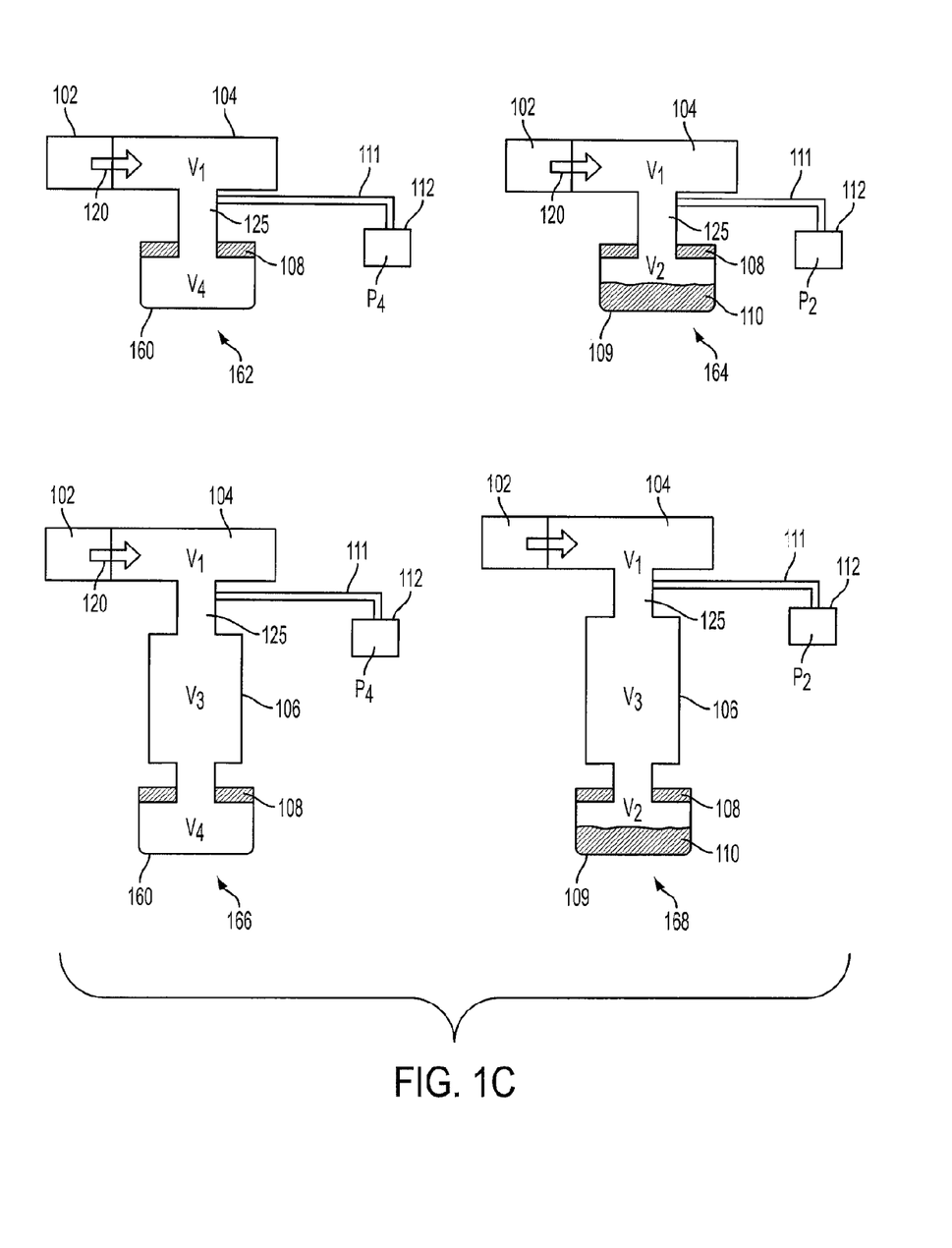
FIG. 1C is another demonstrative setup for implementing the pressure sensing system for volume measurements according to an embodiment of the present invention.

Referring to the diagram 162, the reference container 160 may be coupled directly to the chamber 104, such that they share a common enclosed space with a volume V1+V4. The pressure changing device 102 may apply a predetermined pressure 120 to the chamber 104 and the pressure sensing device 112 may measure a reference pressure P4 of the gas particles contained in the common space. Next, the reference container 160 is replaced by the container 109 and a second pressure P2 is measured. Plugging $P_4$, $P_2$, $V_1+V_4$, and $V_1+V_2$ into Equation 2, $V_2$ can be determined by computing the value of $[(V_1+V_4)P_4/P_2] - V_1$. If the total volume of the container 109 is known, the substance volume 110 can be further determined by subtracting $V_2$ from the total volume of the container 109. For practical reason, the reference container 160 may be identical, in shape and in volume, to the container 109, such that the substance volume 110 may be determined by computing the value of $V_4 - V_2$, where $V_2$ is $[(V_1+V_4)P_4/P_2] - V_1$.

Similarly, the same principle can be applied to the setup with the optional conduit 106 according to an embodiment of the present invention. Referring to the diagrams 166 and 168, the common enclosed space now has a volume $V_1+V_4+V_3$ and a reference pressure $P_4$. Hence, by applying Equation 2 again, $V_2$ can be determined by computing the value of $[((V_1+V_4+V_3)P_4)/P_2] - V_1 - V_3$. If the total volume of the container 109 is known, the substance volume 110 can be further determined by subtracting $V_2$ from the total volume of the container 109. For practical reason, the reference container 160 may be identical, in shape and in volume, to the container 109, such that the substance volume 110 may be determined by computing the value of $V_4 - V_2$, where $V_2$ is $[((V_1+V_4+V_3)P_4)/P_2] - V_1 - V_3$.

Although the predetermined pressure 120 discussed with respect to FIGS. 1A-1C may be higher than the atmospheric pressure according to one embodiment of the present invention, the predetermined pressure 120 may also be substantially close to the atmospheric pressure or even lower than the atmospheric pressure according to another embodiment of the present invention.

To increase the efficiency of the measuring process, the volume measurement system described herein may be implemented with an increased scale. For example, referring to FIG. 3, the PSVM 100 may be arranged in a matrix with a row 302 and a column 304. According to an embodiment of the present invention, the row 302 may include 16 PSVMs 100 and the column 304 may include 24 PSVMs 100, such that a total of 384 PSVMs 100 may be deployed. Instead of measuring one container 109 at a time, the system of FIG. 3 may allow 384 containers 109 be measured at one time. Accordingly, the processor 114 may produce the screen shot 306, which is a variation derived from the screen shot 118, and the screen shot 308, which is a variation derived from the screen shot 116.

Figure 4A:
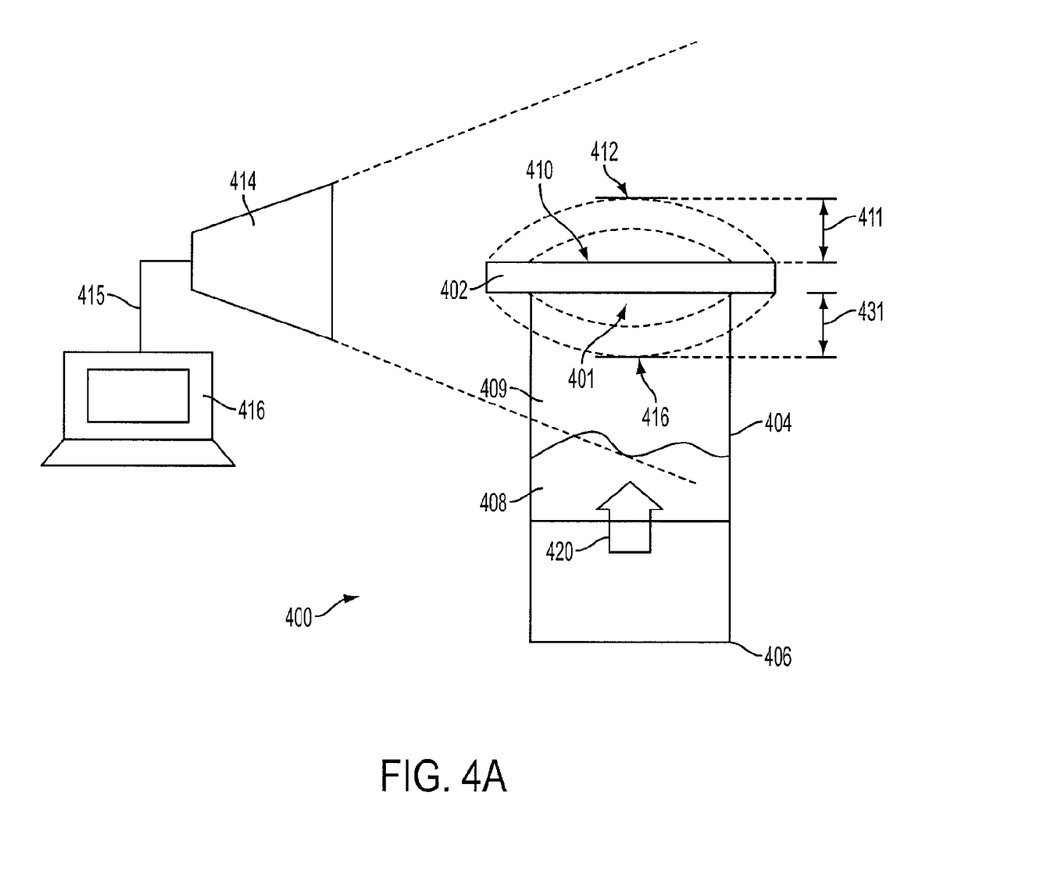
FIG. 4A is an exemplary configuration of a motion sensing system for volume measurements according to an embodiment of the present invention.

The discussion now turns to a motion sensing system for volume measurement (MSVM). Referring to FIG. 4A, a MSVM 400 may include a container 404, a flexible seal 402, a heating device 406, a sensing device 414, and a processor 416 according to an embodiment of the present invention. The container 404 has an opening 401, which may allow the dispensing of a liquid substance, a solid substance, or combinations thereof into the container 404. The dispensed substance has a substance volume 408 which reduces an available space volume 409 defined by the dimensions of the container 404. Substantially similar to the container 109 discussed with respect to FIGS. 1A-1C and FIGS. 2D-2E, the container 404 may be a cuvette, a microplate well, or a test tube according to an embodiment of the present invention.

The flexible seal 402 may serve two functions. First, the flexible seal 402 may cover up and seal the opening 401 of the container 404 to confine the gas particles located in the container 404 and to prevent any outside gas particles from entering the container 404. Second, when the container 404 is heated, the flexible seal 402 may stretch to allow the available space volume 409 to expand as the gas particles located therein receive more heat energy. In general, the flexible seal 402 can be made of any material that serves these two functions. According to an embodiment of the present invention, the flexible seal 402 may be made of rubber, aluminum foil with an adhesive layer, and any other stretchable high density material.

The heating device 406 may be any device capable of generating sufficient heat energy to transfer to the gas particles contained in the container 404. According to the ideal gas law, the volume of a finite amount of gas particles will expand if the temperature of the gas particles increases, given that the pressure of these gas particles remains unchanged. Because the flexible seal 402 is stretchable, it allows the pressure of the gas particles contained in the container 404 to remain substantially unchanged in relative to the atmospheric pressure. Hence, the gas particles may expand the available space volume 409 when heat is applied to the container 404. According to an embodiment of the present invention, the heating device 406 may be a Bunsen burner, a lighter, or an electric heater.

The sensing device 414 may be any device capable of sensing the movement and the position of the stretched flexible seal 402. As shown in FIG. 4A, the flexible seal 402 may be stretched to move above the opening 401 of the container 404. Initially at room temperature, the flexible seal 402 may be at a resting position, which defines a bottom portion 410. When the heat 420 is applied to the container 404, the temperature of the gas particles increases, causing the available space volume 409 to increase. As a result, the flexible seal 402 is stretched to form a convex surface having a top portion 412. The sensing device 414 may sense the position of the top portion 412 relative to the position of the bottom portion 410, thereby sensing a stretch distance 411 of the flexible seal 402 measured from the top portion 412 to the bottom portion 410. For example, the sensing device 414 can be a motion sensing device, a pressure sensing device, or an optical sensing device according to an embodiment of the present invention.

The processor 416 can be coupled to the sensing device 414 via the connection device 415 for receiving sensing information and controlling the sensing device 414. In general, the connection device 415 is essentially the same as the connection device 113, and the processor 416 is essentially the same as the processor 114 discussed with respect to FIG. 1A. Hence, the processor 416 may also receive, process, and output data to be displayed in several screen shots, such as the screen shots 116, 118, 306, and 308. Moreover, the processor 416 may have a sufficient memory to store useful information for determining the available space volume 409 and the substance volume 408.

Figure 4B:
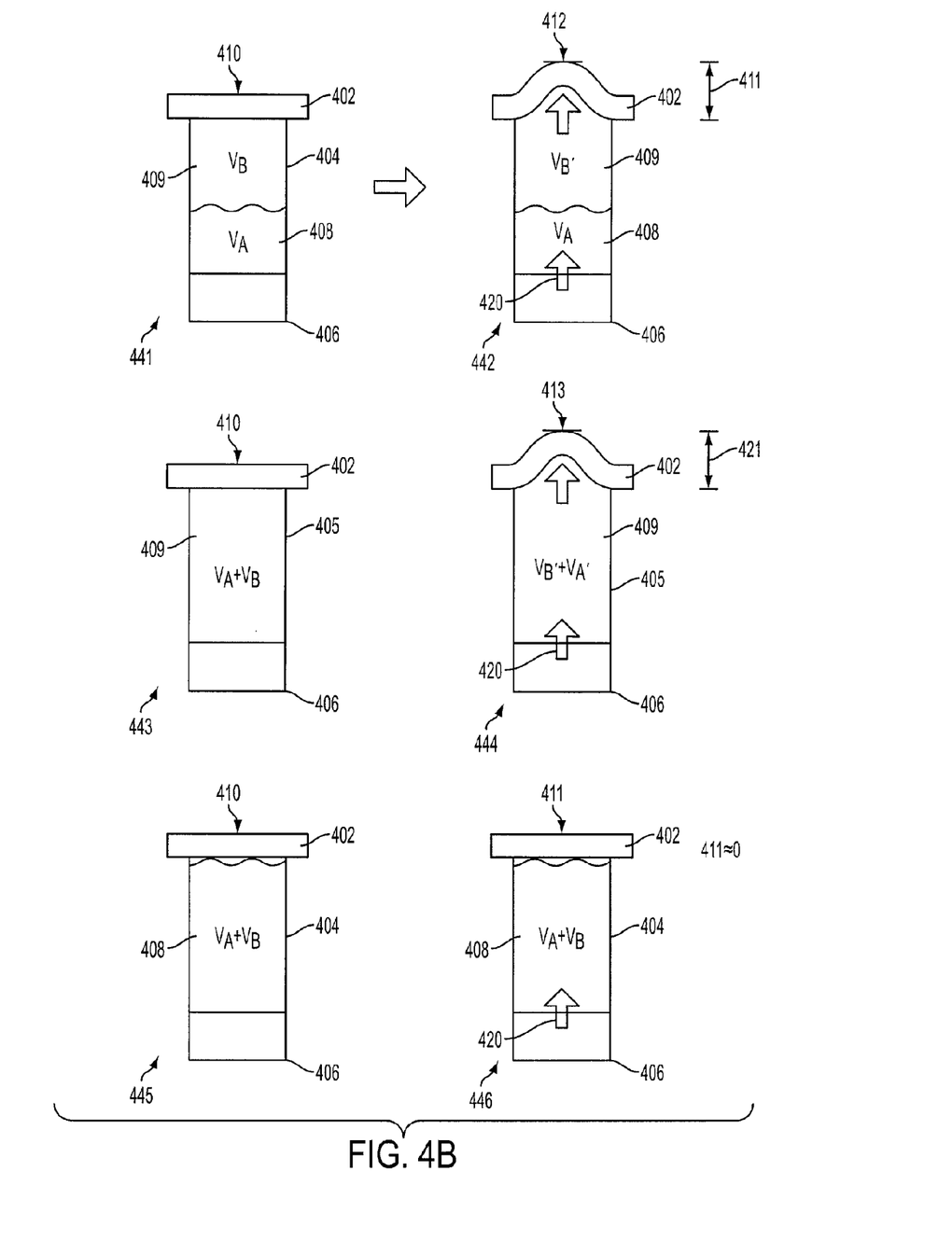
FIG. 4B is a demonstrative setup for implementing the motion sensing system for volume measurements according to an embodiment of the present invention.

FIG. 4B illustrates several aspects of the operative concept behind the system discussed with respect to FIG. 4A. Under the ideal gas law, the magnitude of volume expansion $\Delta V$ of a finite amount of gas particles is directly proportional to the total number of gas particles N and the temperature increment per gas particle $\Delta T$. That is, $\Delta V \alpha N^*\Delta T$, where N is a constant when the gas particles are contained in a closed space. Hence, if the temperature increment per gas particle $\Delta T$ is predefined and known, then the magnitude of volume expansion $\Delta V$ may be used to determine the number of gas particles N having their temperature increased. Because the number of gas particles N reflects the available space volume these gas particles occupy, the predefine temperature increment $\Delta T$ and the magnitude of volume expansion $\Delta V$ of a finite amount of gas particles may also be used to determine the available space volume of these gas particles at room temperature.

Referring to the diagram 441, the container 404 is sealed by the flexible seal 402, and it contains a liquid or solid substance with a substance volume 408, thereby leaving an available volume 409 for a gas substance. At room temperature, $V_B$ is the value of the available space volume and $V_A$ is the value of the substance volume. Referring to the diagram 442, the heating device 406 applies a heat 420 of a predefined temperature $\Delta V$ to the container. Because liquid and solid substances normally do not follow the ideal gas law and have substantially stable volumes under a certain temperature range, the substance volume 408 remains unchanged. However, the gas particles contained within the container 404 is subject to the ideal gas law, such that the available space volume 409 expands from VB to $V_B'$. As a result, the flexible seal 402 is stretched to form a convex surface having a top portion 412. The sensing device may then measure the stretch distance 411.

According to an embodiment of the present invention, the memory of the processor 416 may store a look-up table that matches a stretch distance 411 with a particular available space volume 409 with respect to the container 404. After determining the available space volume 409 of container 404, the processor 416 may then determine the substance volume by subtracting the available space volume 409 from the total volume of the container 409, which may also be stored in the memory of the processor 416. According to another embodiment of the present invention, the processor 416 may calculate the magnitude of volume expansion, which is $\Delta V = V_B' - V_B$, and apply the ideal gas law to determine the available space volume 409 and the substance volume 408.

The diagram 443 introduces the use of a reference container 405 in the MSVM 400 according to yet another embodiment of the present invention. The reference container 405 may be identical in shape and size to the container 404, except that the reference container 405 contains no liquid or solid substance. As such, the available space volume 409 of the container 405 should be the sum of VA and VB and the substance volume of the container 405 should be about zero. Referring to the diagram 444, the heating device 406 applies the heat 420 with the predefined temperature $\Delta T$ to the reference container 405. The available space volume 409 expands from VA+VB to VA'+VB', stretching the flexible seal 402 to form a convex surface with a reference top portion 413. Because the reference top portion 413 is the result of a maximum volume expansion, the reference stretch distance 412 may be used as a reference point for comparing with other stretch distances 411. Accordingly, the processor 416 may use a fractional model based on the reference stretch distance 421 to determine the available space volumes 409 of the containers 404 with various substance volumes 408.

The diagrams 445 and 446 present a situation in which the processor 406 or an operator may instantly identify a substantially filled container 404 upon the application of the heat 420 with the predefined temperature $\Delta T$. In the diagram 445, the container 404 is substantially filled with a liquid or solid substance, leaving substantially no room for the gas particles. As such, the substance volume 408 may have a value of $V_A$ $V_B$, which is unlikely to subject to change even after the heat 420 is applied. As shown in the diagram 446, the flexible seal 402 is barely stretched, such that the top portion 411 is in almost the same position as the bottom portion 410. Accordingly, the stretch distance 411 is close to nothing, such that the operator and/or the processor 416 may readily determine that the container 404 is not empty and may be substantially filled.

Figure 3:
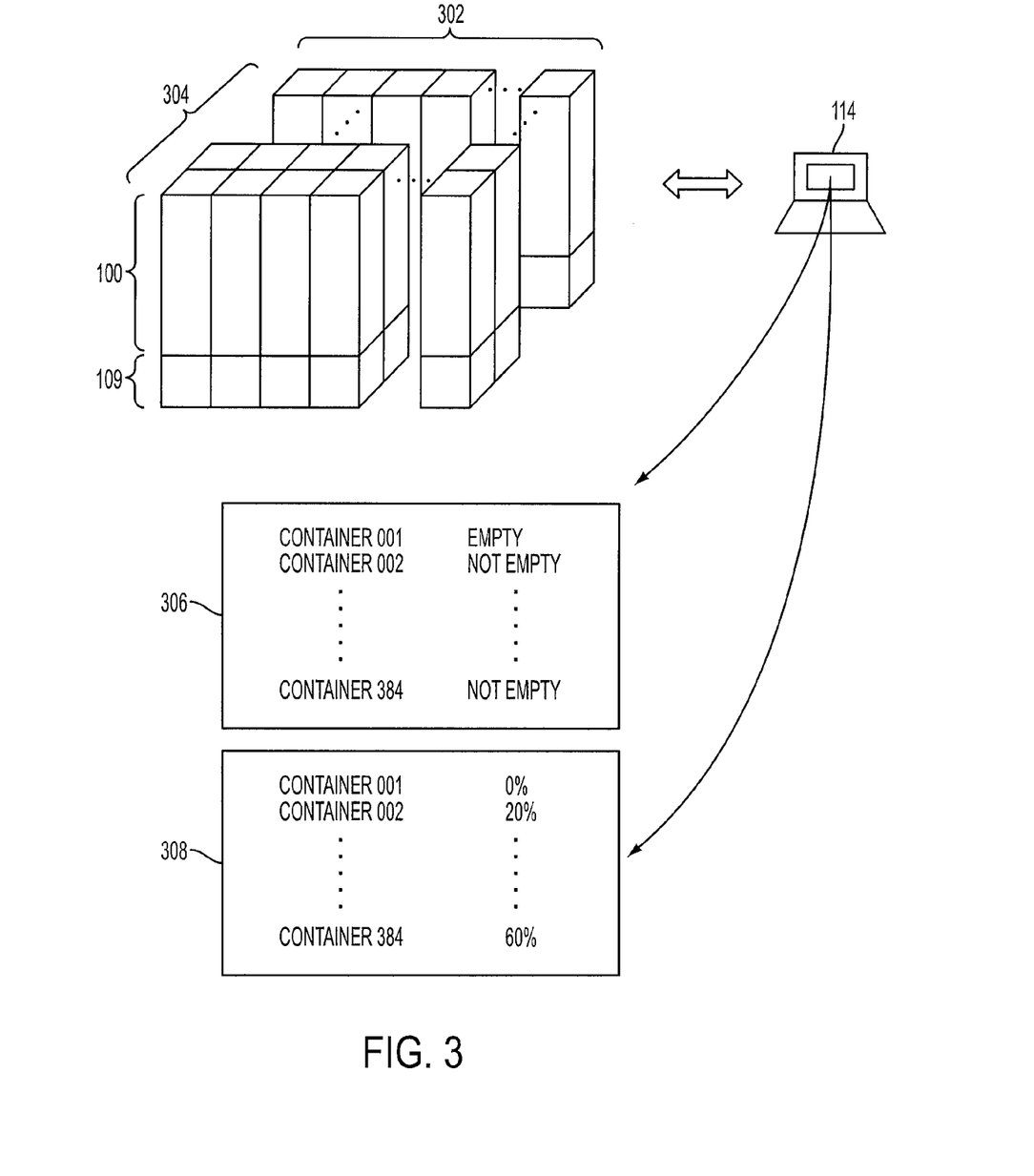
FIG. 3 is an exemplary configuration of a system where multiple pressure sensing volume gauges are applied according to an embodiment of the present invention.

The MSVM 400 described with respect to FIGS. 4A and 4B may be deployed in a similar manner as discussed with respect to FIG. 3 according to another embodiment of the present invention. Moreover, it is to be understood that the MSVM 400 may also determine the presence or absence of a solid or liquid substance located in the container 404 upon determining the available space volume 409. Although the PSVM 100 may differ from the MSVM 400 in terms of the operative concept, they may be deployed to serve the same purposes, either alone or combined.

Although a heating device 406 is used to expand the space volume of the gas particles in the container 404 and the reference container 406 of FIGS. 4A and 4B, a cooling device may be used to contract the space volume of the gas particles in the container 404 and the reference container 406 as well according to another embodiment of the present invention. Under the ideal gas law, the magnitude of volume contraction $\Delta V$ of a finite amount of gas particles is directly proportional to the total number of gas particles N and the temperature decrement per gas particle $\Delta T$.

Referring again to FIG. 4A, the MSVM 400 may replace the heating device 406 with a cooling device 460 (not shown). When the available space volume 409 contracted after the gas particles are cooled, the flexible seal 402 will be stretched downward to form a concave shape having an inverse top portion 416. The sensing device 414 may detect an inverse stretch distance 431 measured from the bottom portion 410 of the flexible seal 402 to the inverse top portion 416. The processor 416 may follow the scientific principles and algorithmic steps discussed above to determine the available space volume 409 and the substance volume 408 of the container 404.

Figure 5:
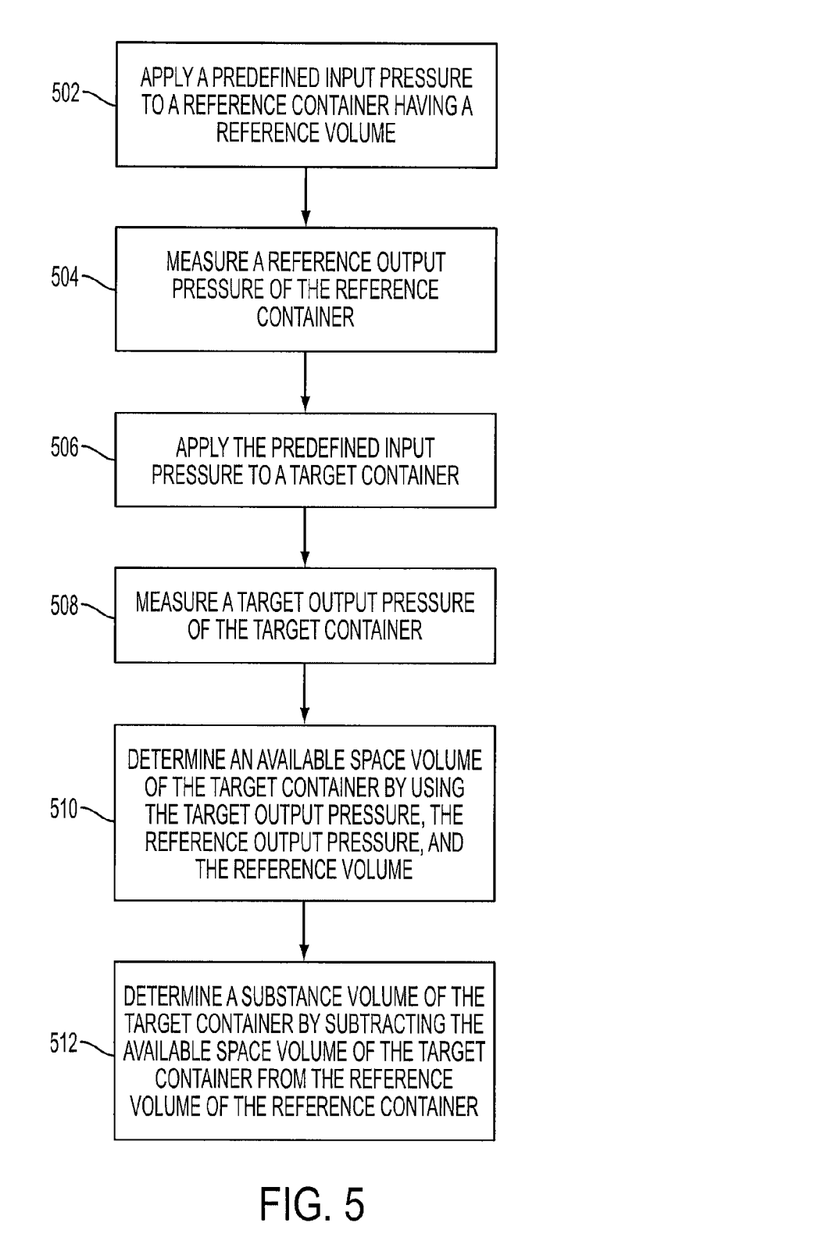
FIG. 5 is a flow diagram illustrating the steps of a volume measuring method according to an embodiment of the present invention.

FIG. 5 is a flow diagram illustrating the method steps of a pressure sensing system for volume measurement according to an embodiment of the present invention. These method steps are related to the discussion with respect to FIGS. 1A to 1C. Although these steps might introduce terminologies different from those in the previous discussion, these steps are consistent with the spirit and concept of the previous discussion and should not be construed otherwise. In the step 502, a predefined input pressure is applied to a reference container having a reference volume. In the step 504, a reference output pressure of the reference container may be measured. In the step 506, the same predefined input pressure is applied again to a target container, which may or may not contain any solid or liquid substance. In the step 508, a target output pressure of the target container may be measured. In the step 510, an available space volume of the target container may be determined by using the target output pressure, the reference output pressure, and the reference volume. In the step 512, a substance volume of the target container may be determined by subtracting the available space volume of the target container from the reference volume of the reference container, given that the reference volume is essentially the same as the available space volume of the target container when the target container is empty.

Figure 6:
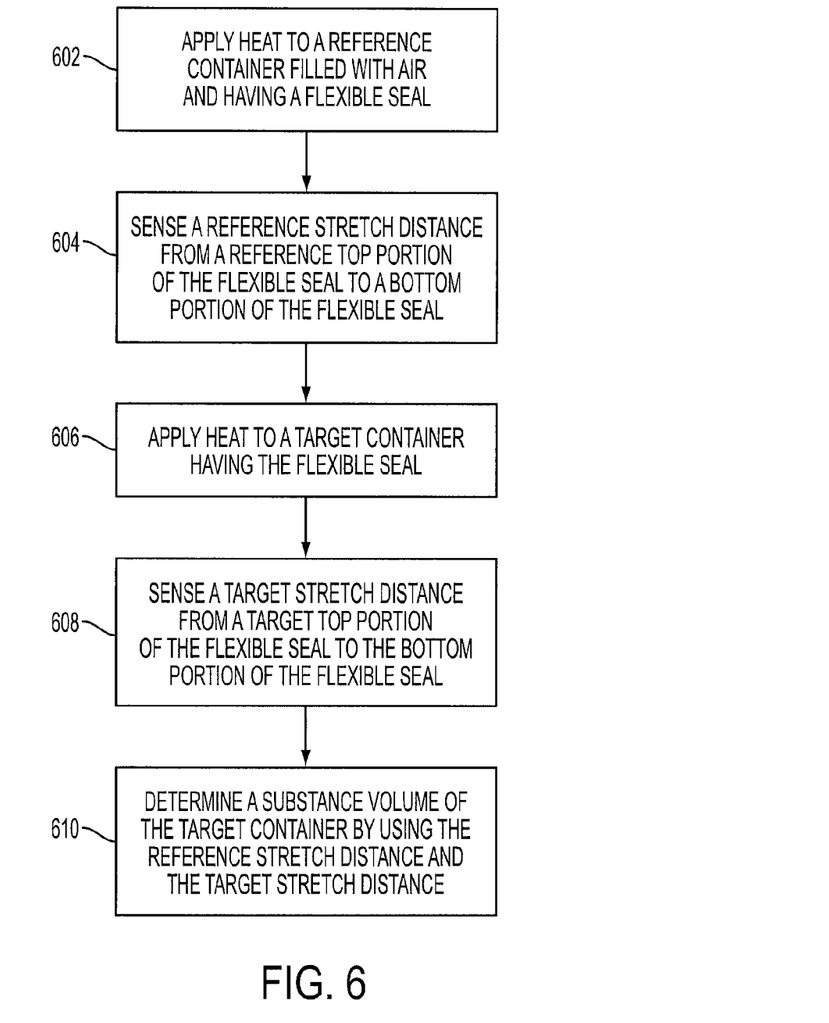
FIG. 6 is a flow diagram illustrating the steps of a volume measuring method according to an embodiment of the present invention.

FIG. 6 is a flow diagram illustrating the method steps of a motion sensing system for volume measurement according to another embodiment of the present invention. These method steps are related to the discussion with respect to FIGS. 4A to 4B. Although these steps might introduce terminologies different from those in the previous discussion, these steps are consistent with the spirit and concept of the previous discussion and should not be construed otherwise. In the step 602, heat may be applied to a reference container filled with air and having a flexible seal. In the step 604, a reference stretch distance may be sensed from a reference top portion of the flexible seal to a bottom portion of the flexible seal. In the step 606, heat may be apply to a target container having the same flexible seal. In the step 608, a target stretch distance may be sensed from a target top portion of the flexible seal to the bottom portion of the flexible seal. In the step 610, a substance volume of the target container may be determined by first determining an available space volume by using the reference stretch distance and the target stretch distance.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiment can be configured without departing from the scope and spirit of the present invention. Therefore, it is to be understood that, within the scope of the appended claims, the present invention may be practiced other than as specifically described herein.

What is claimed is:

1. A pressure sensing system for volume measurements, comprising:
   a container having a container opening;
   a chamber having a chamber opening that is sealably coupled to the container opening to form an enclosed space defined by a portion of the container and a portion of the chamber;
   a pressure changing device at least partially located within the chamber, the pressure changing device configured to increase a pressure of a gas substance contained within the enclosed space at a predetermined pressure;
   a pressure sensing device configured to measure a new pressure of the gas substance contained within the enclosed space after the pressure changing device increases the pressure of the gas substance contained within the enclosed space;
   a memory stored with a reference volume corresponding to a volume of the container when empty of a solid or liquid substance and a reference pressure corresponding to a pressure of the container when empty of a solid or liquid substance; and
   a processor configured to determine an available space volume of the container by using the reference volume, the reference pressure, and the new pressure, such that a temperature is not used to determine the available space volume of the container.

2. The system of claim 1, further comprising a matching seal coupled between the chamber opening and the container opening.

3. The system of claim 1, wherein the processor is configured to determine the available space volume by applying the ideal gas law.

4. The system of claim 1, wherein the processor is configured to determine a substance volume of a liquid substance, a solid substance, or combinations thereof located within the container.

5. The system of claim 1, wherein the processor is configured to determine the presence or absence of a liquid substance, a solid substance, or combinations thereof located within the container.

6. The system of claim 1, wherein the pressure changing device is a piston, a pump, or a heater, and wherein the pressure sensing device is a pressure gauge, a strain gauge, or a fiber optics pressure sensor.

7. The system of claim 1, wherein the container is a cuvette, a microplate well, or a test tube.

8. A pressure sensing system for volume measurements, comprising:
a container having a container opening;
a chamber defining a chamber opening configured to sealably couple to the container opening and a chamber volume;
a pressure changing device at least partially located within the chamber, the pressure changing device configured to change a pressure of a gas substance contained within the chamber and a reference container having a reference volume corresponding to a volume of the reference container when empty of a solid or liquid substance when a reference container opening of the reference container is sealably coupled to the chamber opening, and configured to change a pressure of a gas substance contained within the chamber and the container when the container opening is sealably coupled to the chamber opening;
a pressure sensing device configured to measure a reference pressure of the gas substance contained within the chamber and the reference container after the pressure changing device changes the pressure of the gas substance contained within the chamber and the reference container, and configured to measure a new pressure of the gas substance contained within the chamber and the container after the pressure changing device changes the pressure of the gas substance contained within the chamber and the container; and
a processor configured to determine an available space volume of the container by using the new pressure, the reference pressure, the chamber volume, and the reference volume, such that a temperature is not used to determine the available space volume of the container.

9. The system of claim 8, wherein the pressure changing device is a piston, a pump, or a heater, wherein the pressure sensing device is a pressure gauge, a strain gauge, or a fiber optics pressure sensor, and wherein the container is a cuvette, a microplate well, or a test tube.

10. The system of claim 8, wherein the processor is configured to determine the available space volume by applying the ideal gas law.

11. The system of claim 8, wherein the processor is configured to determine a substance volume of a liquid substance, a solid substance, or combinations thereof, located within the container.

12. The system of claim 8, wherein the processor is configured to determine the presence or absence of a liquid substance, a solid substance, or combinations thereof located within the container.

13. The system of claim 8, wherein the reference volume is substantially the same as the available space volume when the container only contains the gas substance.

14. A method for measuring volume, comprising:
increasing a pressure inside of a reference container having a reference volume, using a pressure changing device coupled to a chamber that is directly coupled to an opening of the reference container;
measuring a reference pressure of the reference container;
replacing the reference container with a target container that corresponds to the reference container having a target substance;
applying a predefined input pressure to the target container, using the pressure changing device coupled to the chamber that is directly coupled to an opening of the target container;
measuring a new pressure of the target container;
determining an available space volume of the target container by using the new pressure, the reference pressure, and the reference volume, such that a temperature is not used to determine the available space volume of the target container; and
determining a substance volume of the target substance by subtracting the available space volume of the target container from the reference volume of the reference container.

15. A pressure sensing system for volume measurements, comprising:
a container having a container opening and defining a total volume having a substance volume and an available space volume defined by air located within the container such that the available space volume is substantially the same as the total volume when the container is filled with only air;
a pressure changing device coupled to a chamber that is directly coupled to the container opening and configured to change a pressure of the air located within the container;
a pressure sensing device configured to measure a new pressure of the air located within the container; and
a processor having a memory stored with the total volume of the container and a reference pressure of the container corresponding to a pressure of the container when empty of a solid or liquid substance and a predetermined pressure is applied, the processor configured to determine the available space volume and the substance volume of the container by using only the total volume, the reference pressure, and the new pressure of the container.

* * * * *